Figure 1:
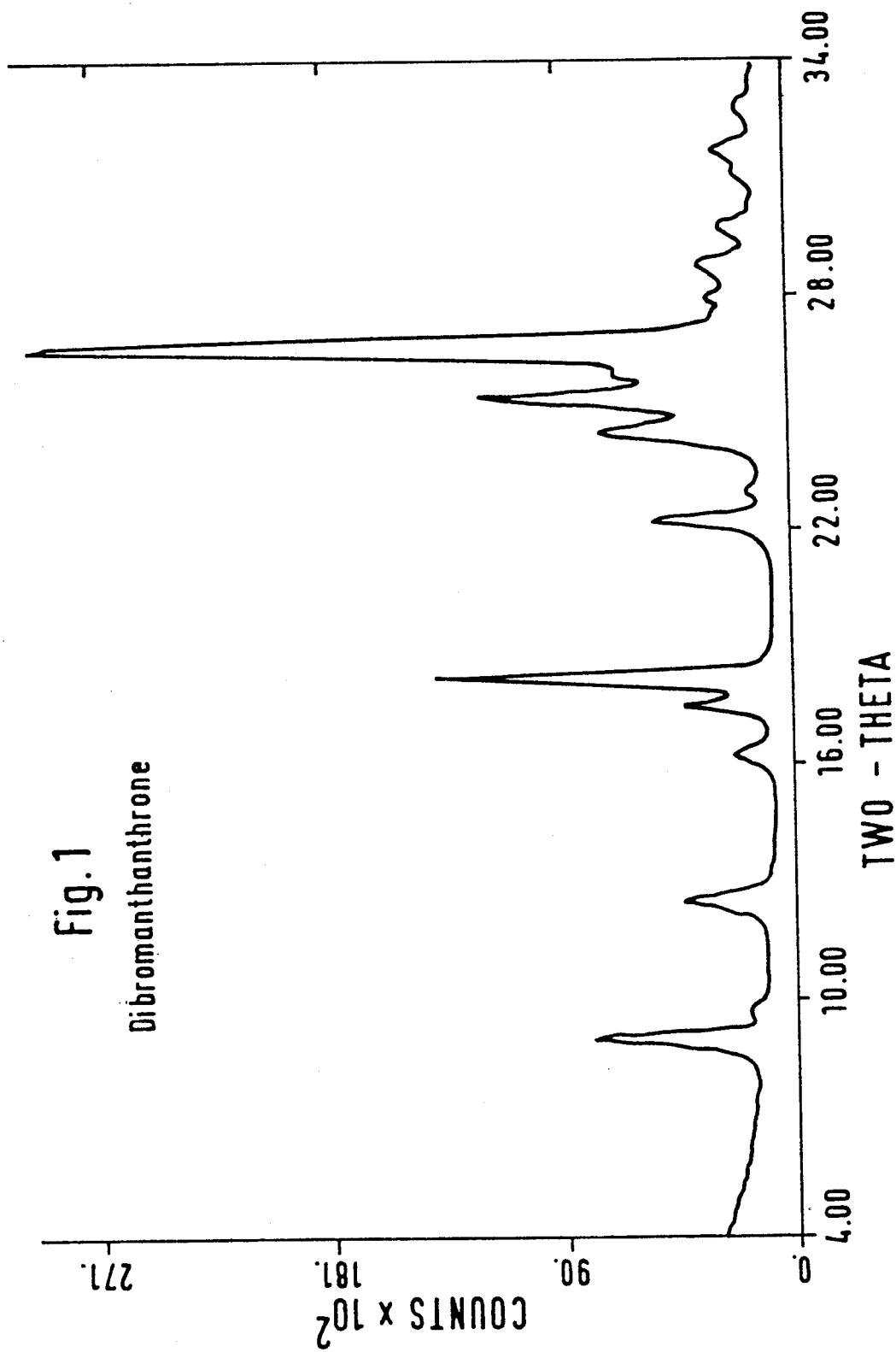

United States Patent [19]

Dietz et al.

[11] Patent Number: 5,035,747
[45] Date of Patent: Jul. 30, 1991

[54] MIXED CRYSTAL PIGMENTS OF THE ANTHANTHRONE SERIES, AND PREPARATION AND USE THEREOF

[75] Inventors: Erwin Dietz, Kelkheim; Manfred Urban, Wiesbaden, both of Fed. Rep. of Germany

[73] Assignee: Hoechst Aktiengesellschaft, Frankfurt am Main, Fed. Rep. of Germany

[21] Appl. No.: 455,499

[22] Filed: Dec. 22, 1989

[30] Foreign Application Priority Data

Dec. 28, 1988 [DE] Fed. Rep. of Germany ....... 3844063

[51] Int. Cl.$^5$ .................. C09B 48/00; C09B 3/50
[52] U.S. Cl. .................. 106/495; 106/494; 552/284; 552/285
[58] Field of Search .................. 552/284, 285; 106/288 Q, 289, 309, 495, 494

[56] References Cited

U.S. PATENT DOCUMENTS 4,705,572 11/1987 Spietschka et al. ................. 552/284

Primary Examiner—C. Warren Ivy
Assistant Examiner—Raymond Covington

[57] ABSTRACT

Mixed crystal pigments of the anthanthrone series and preparation and use thereof Mixed crystal pigments of the anthanthrone series formed from two or more compounds of the formula I

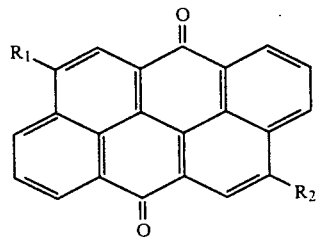

where $R_1$ and $R_2$ are each hydrogen, chlorine, bromine, iodine, nitro, cyano, amino, hydroxyl, $C_1$-$C_4$-alkyl, $C_1$-$C_4$-alkoxy, aryloxy, $C_1$-$C_4$-alkylsulfonyl, benzylsulfonyl, acetoxy, anilino, naphthindonylamino or phthalimido, wherein each component may be present in an amount of 1-99%, the preparation thereof by revatting, bead milling, dry milling, dissolving in inorganic acid and precipitating by pouring into water, and use thereof for pigmenting high molecular weight natural or synthetic organic materials.

10 Claims, 4 Drawing Sheets

Dichloranthanthrone

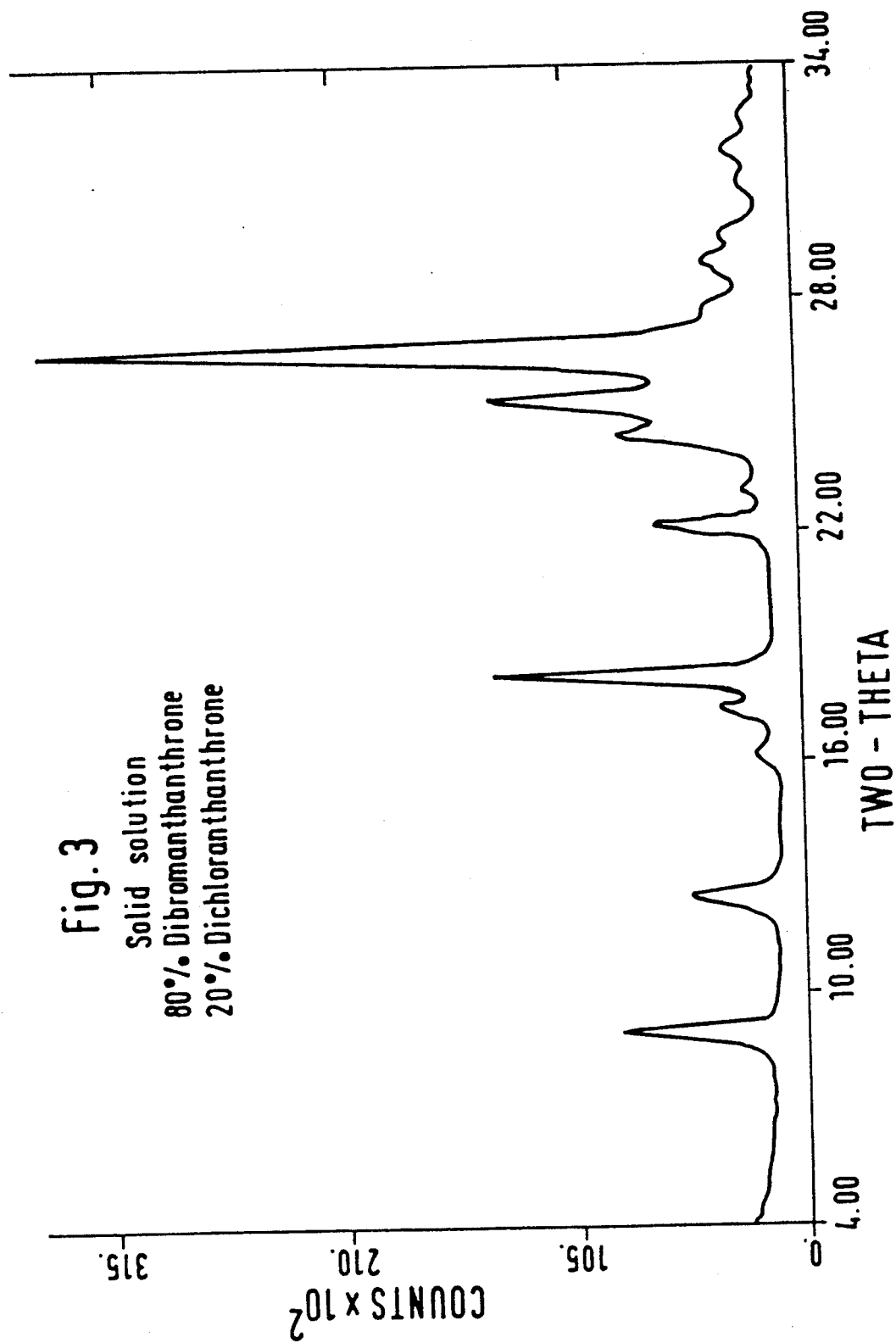

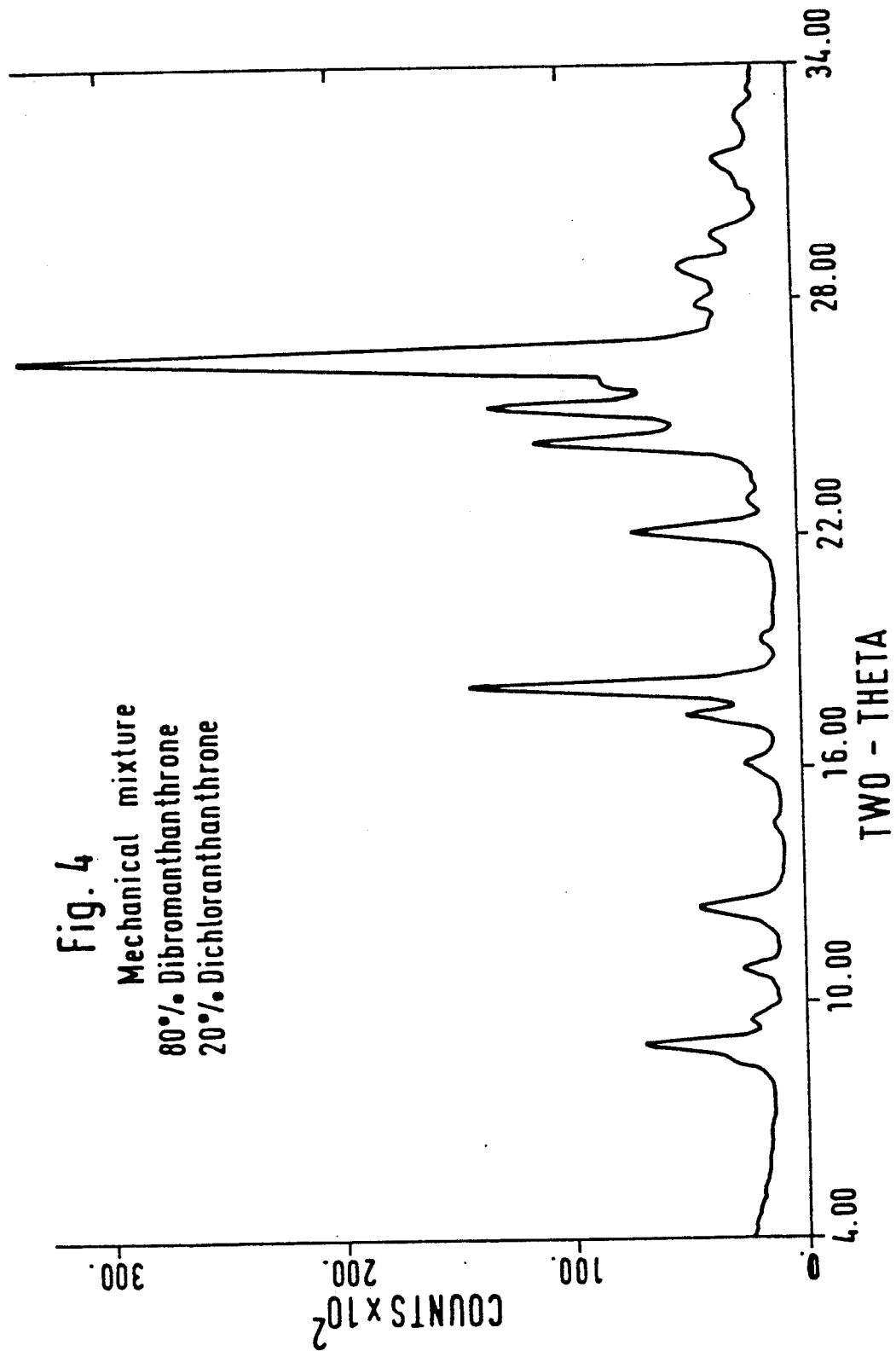

MIXED CRYSTAL PIGMENTS OF THE ANTHANTHRONE SERIES, AND PREPARATION AND USE THEREOF

DESCRIPTION

Mixed crystal pigments of the anthanthrone series, and preparation and use thereof.

The present invention relates to novel mixed crystal pigments of the anthanthrone series, to the preparation thereof and to the use thereof for coloring high molecular weight organic materials.

Anthanthrones are known compounds which are used as pigments and vat dyes. They can be prepared by cyclization of the corresponding 1,1'-dinaphthyl-8,8'-dicarboxylic acids as described in German Patent 507,338 or by subsequent halogenation of anthanthrone as described in German Patent 458,598 and Fiat Final Report 1313 II.

Mixed crystal formation significantly extends the range of possible uses of anthanthrone pigments. The properties of mixed crystal pigments differ appreciably from those of corresponding physical mixtures of the individual components. They have in particular purer hues and higher color strengths. Hues are obtained which cannot be obtained with the individual components. The fastness properties are excellent.

It has been found that two or more differently substituted anthanthrones can be combined with one another to form mixed crystals or solid solutions. In a mixed crystal, one or more added components are present in the crystal lattice of a host compound. The X-ray diffraction diagram of a mixed crystal then only shows the (frequently expanded) crystal lattice of the host compound, while the X-ray diffraction diagram of the corresponding physical mixture shows all the components.

The present invention accordingly provides mixed crystal pigments of the anthanthrone series formed from two or more compounds of the general formula I

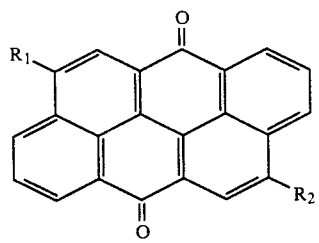

I where $R_1$ and $R_2$ are each hydrogen, chlorine, bromine, iodine, nitro, cyano, amino, hydroxyl, $C_1$–$C_4$-alkyl, $C_1$–$C_4$-alkoxy, aryloxy, for example phenoxy, which may be halogen-substituted, for example by chlorine or bromine, or $C_1$–$C_4$-alkyl-substituted, $C_1$–$C_4$-alkylsulfonyl, benzylsulfonyl, which may be halogen-substituted, for example by chlorine or bromine, or $C_1$–$C_4$-alkyl-substituted, acetoxy, anilino, which may be halogen-substituted, for example by chlorine or bromine, $C_1$–$C_4$-alkyl-substituted or haloalkyl-substituted, for example by chloroalkyl or bromoalkyl, naphthindonylamino or phthalimido, wherein each component may be present in an amount of from 1 to 99%, preferably from 70 to 95%, and $R_1$ and $R_2$ may identical or different.

Preferred mixed crystal pigments are those which contain two or more compounds of the general formula I where R and $R_2$, which may be identical or different, are each chlorine, bromine, iodine, methoxy or ethoxy.

From their synthesis the compounds of the general formula I mentioned are obtained as crude anthanthrone pigments. They are prepared by cyclization of the corresponding 1,1'-dinaphthyl-8,8'-dicarboxylic acids or of mixtures of differently substituted 1,1'-dinaphthyl-8,8'-dicarboxylic acids or by subsequent halogenation or nitration of anthanthrone.

The mixed crystal pigments according to the present invention can be prepared as follows:

Two or more finely or coarsely crystalline crude anthanthrone pigments or coarsely crystalline crude mixed crystal anthanthrone pigments of the general formula I mentioned are initially converted by (1) revatting from an aqueous solution or suspension at temperatures of from about 0° to about 80° C., (2) bead milling in water or solvents, such as, for example, alkanols ($C_2$–$C_6$), for example ethanol, propanol, isopropanol, n-butanol or isobutanol, or aromatic hydrocarbons, for example toluene, xylenes or ethylbenzene, (3) dry grinding with or without salt, for example sodium sulfate, sodium chloride, calcium chloride or aluminum sulfate, (4) dissolving in a concentrated inorganic acid and precipitating by pouring into water, or (5) suitable synthesis management under reaction conditions chosen in such a way that, after the synthesis, the anthanthrone pigments are present in solution and are precipitated on pouring into water (German Patents 507,338 and 458,598), preferably by methods (1) and (2), into the corresponding finely divided crude mixed crystal anthanthrone pigments and subsequently converting these by a finish (conditioning treatment) in an inert organic solvent or in a dilute inorganic acid at temperatures in each case of from about 50° to about 200° C., preferably from about 80° to about 160° C., with or without shearing, into the mixed crystal anthanthrone pigments of the abovementioned general formula I.

The finish in an inert solvent may also be carried out under superatmospheric pressure.

Finishing is preferably carried out with organic solvents whose boiling points are above 60° C. Suitable solvents for this purpose are for example alkanols ($C_1$–$C_{10}$), such as methanol, ethanol, propanol, isopropanol, n-butanol or isobutanol, dialkyl ($C_1C_6$) or cyclic ketones, for example acetone, diethyl ketone, methyl ethyl ketone or cyclohexanone, ethers and glycol ethers, for example methoxybutanol, aromatic hydrocarbons, for example toluene, xylenes or ethylbenzene, aromatic chlorohydrocarbons, for example chlorobenzene, o-dichlorobenzene, 1,2,4-trichlorobenzene or bromobenzene, aromatic nitro compounds, for example nitrobenzene or nitrophenol, aliphatic carboxamides, for example formamide or dimethylformamide, cyclic carboxamides, for example N-methylpyrrolidone, $C_1$–$C_4$-alkyl-$C_1$–$C_4$-carboxylates, for example butyl formate, ethyl acetate or propyl propionate, and $C_1$–$C_4$-alkyl benzoate, for example ethyl benzoates, heterocyclic bases, for example pyridine, morpholine, or picoline, and also dimethyl sulfoxide and sulfolane.

Preferred organic solvents for the conditioning treatment are alkanols of from 2 to 6 carbon atoms, for example ethanol, propanol, isopropanol, n-butanol, isobutanol or pentanols, aromatic hydrocarbons, for example xylenes, ethylbenzene or cumene, and also aromatic nitro compounds, for example nitrobenzene or nitrophenol.

The conditioning treatment may also be carried out in dilute inorganic acids, in particular in dilute sulfuric acid.

The comminution and conditioning treatments can also be carried out in the presence of surface-active agents. Suitable surface-active compounds for this purpose are anionic, cationic, nonionic and/or amphoteric surfactants.

The finish may be carried out in stirred vessels. However, it can also be carried out in grinding or kneading apparatus by the application of shearing forces.

Mixed crystal formation is detected by X-ray diffraction. The properties of mixed crystal pigments differ distinctly from those of the corresponding physical mixtures. The average particle size of the mixed crystal pigments is between 0.05 and 0.5 $\mu$m. They have excellent coloristic properties and outstanding weatherability. Mixed crystal formation significantly extends the range of possible uses for these pigments.

The coarsely crystalline crude mixed crystal anthanthrone pigments used inter alia as starting compounds in the process according to the present invention can be prepared by dissolving two or more crude anthanthrone pigments in an inert organic solvent by heating and recrystallizing them by cooling. Suitable organic solvents for this purpose are for example carboxamides, such as dimethylformamide, N-methylpyrrolidone, aromatic heterocycles, such as pyridine or quinoline, sulfurcontaining solvents, such as dimethyl sulfoxide, haloaromatics, such as trichlorobenzenes or α-chloronaphthalene, nitroaromatics, such as nitrobenzene, nitrochlorobenzenes or nitrophenols, and other aromatic solvents, such as phenol or benzoic esters.

The mixed crystal pigments according to the present invention can be prepared in transparent or high-hiding form depending on the choice of conditioning treatment. They are suitable for pigmenting high molecular weight natural or synthetic organic materials, for example cellulose ethers or esters, such as ethylcellulose, nitrocellulose, cellulose acetate or cellulose butyrate, natural or synthetic resins, such as polymerization resins or condensation resins, for example amino resins, in particular urea- or melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or mixed. It is immaterial here whether the high molecular weight organic compounds mentioned are present as plastic materials and melts or in the form of spinning solutions, coatings, paints or printing inks. Depending on the intended use, it is advantageous to use the pigments which are to be used according to the present invention as toners or in the form of preparations or dispersions. Based on the high molecular weight organic material to be pigmented, the mixed crystal pigments prepared according to the present invention are used in an amount of from preferably 0.1 to 10% by weight.

The mixed crystal pigments prepared according to the present invention are particularly suitable for use in baking finish systems, for example alkyd-melamine resin or acrylic-melamine resin finishes, two-component coating systems based on polyisocyanate-crosslinked acrylic resins, and waterborne coating systems. The incorporation and application of the coating systems gives strong, pure and shiny coatings of excellent weatherability. In modern coating systems, the mixed crystal pigments show very good flow characteristics, even at high pigment concentrations, combined with excellent antiflocculation. These mixed crystal pigments are also eminently suitable for use in plastics, in particular polyolefins, such as polyethylene, polypropylene, polyvinyl chloride or polystyrene. The mixed crystal pigments are very readily dispersible in these plastics and produce brilliant strong colorings.

If used in printing inks, they produce strong, high-gloss prints. Of the large number of printing inks, printing inks based on nitrocellulose have proved particularly useful.

To assess the properties of the claimed mixed crystal pigments in coating systems, an alkyd-melamine resin lacquer (AM6) based on a medium oil, non-drying alkyd resin formed from synthetic fatty acids and phthalic anhydride was chosen from the large number of known systems. The rheology of the mill base after dispersing is rated against the following 5-point scale:

| | |
|---|---|
| 5 mobile | 2 slightly set |
| 4 liquid | 1 fully set |
| 3 viscous | |

After the milled base has been diluted to the pigment use concentration, the viscosity was measured with a Rossmann "visco spatula", model 301, from Erichsen. Gloss measurements were carried out at an angle of 20° in accordance with German Standard Specification DIN 67350 (ASTMD 523) using a "multigloss" meter from Byk-Mallinckrodt. In the examples below, parts and percentages are by weight.

EXAMPLE 1

8.75 g of crude dibromoanthanthrone pigment, prepared by bromination of anthanthrone, and 3.75 g of diiodoanthanthrone, prepared by iodination of anthanthrone, are introduced in 5 l of nitrobenzene and dissolved at the boil, and the solution is filtered while still hot. The filtrate is cooled down and filtered with suction, and the filter residue is washed with nitrobenzene, and then with ethanol until free of nitrobenzene, and dried at 80° C. 11.73 g are obtained of highly crystalline crude mixed crystal pigment whose X-ray diffraction spectrum differs from the X-ray diffraction spectrum of the corresponding physical mixture of the abovementioned starting materials.

EXAMPLE 2

8.0 of crude diethoxyanthanthrone pigment, prepared by cyclization of 1,1'-dinaphthyl-4,4'-diethoxy-8,8'-dicarboxylic acid, and 2.0 g of dimethoxyanthanthrone, prepared by cyclization of 1,1'-dinaphthyl-4,4'-dimethoxy-8,8'-dicarboxylic acid, are introduced into 5 l of nitrobenzene and dissolved at the boil, and the solution is filtered while still hot. The filtrate is cooled down and filtered with suction, and the filter residue is washed with nitrobenzene and then with ethanol until free of nitrobenzene, and dried at 80° C.

8.44 g are obtained of a highly crystalline crude mixed crystal pigment whose X-ray diffraction spectrum differs from the X-diffraction spectrum of the corresponding physical mixture of the abovementioned starting materials.

EXAMPLE 3

250 ml of water are introduced first, followed by 15 g of sodium dithionite and 0.25 g of a commercial dispersant based on an alkylphenol polyglycol ether sulfate. 9.0 g of crude dibromoanthanthrone pigment, prepared by bromination of anthanthrone, and 1.0 g of crude diiodoanthanthrone pigment, prepared by iodination of anthanthrone, were added. 20 g of 33% strength sodium hydroxide solution was then added dropwise at 20°–25° C., resulting in a pH of 12.7. The mixture was then stirred at 20°–25° C. for 1 hour. After stirring for 1 hour, 5.85 g of 85% strength phosphoric acid were added dropwise in the course of 15 minutes until the pH was 10–11. The mixture was then stirred at 20°–25° C. for 1 hour, and 22.5 g of 35% strength perhydrol and 12.3 g of 33% strength sodium hydroxide solution were simultaneously added dropwise at pH 10–11. After completion of the addition, the mixture was subsequently stirred at 20°–25° C. for 15 hours and filtered with suction, and the fiber residue was washed neutral.

The press cake thus obtained is suspended in a solution of 54.1 ml of water and 0.7 g of anhydrous sodium carbonate. 10 g of nitrobenzene are added, and the mixture is heated at the boil for 3 hours. The nitrobenzene is then distilled off with steam, and the mixed crystal pigment is filtered off with suction, washed neutral and dried at 80° C.

9.85 g are obtained of a mixed crystal pigment whose X-ray diffraction spectrum differs distinctly from the X-ray diffraction spectrum of the corresponding physical mixture of the abovementioned starting materials. Incorporated into AM6 lacquer, the mixed crystal pigment produces strong and bright transparent coatings, while coatings prepared with the physical mixture are very dark and dull.

EXAMPLE 4

2,000 ml of water are introduced first, followed by 120 g of sodium dithionite and 2 g of a commercial dispersant based on an alkylphenol polyglycol ether sulfate. 64 g of crude dibromoanthanthrone pigment, prepared by bromination of anthanthrone, and 16 g of crude diiodoanthanthrone pigment, prepared by iodination of anthanthrone, were added. 160 g of 33% strength sodium hydroxide solution was then added dropwise at 20°–25° C., resulting in a pH of 12.5. After stirring for one hour at 20°–25° C., 49.2 g of 85% strength phosphoric acid were added dropwise in the course of 15 minutes until the pH was 10–11. The mixture was then stirred at 20°–25° C. for 1 hour, and 180 g of 35% strength perhydrol and 100.5 g of 33% strength sodium hydroxide solution were simultaneously added dropwise at pH 10–11. After completion of the addition, the mixture was subsequently stirred at 20°–25° C. for 15 hours and filtered with suction, and the filter residue was washed neutral.

The press cake thus obtained is suspended in a solution of 419 ml of water and 5.6 g of anhydrous sodium carbonate. 80 g of nitrobenzene are added, and the mixture is heated at the boil for 3 hours. The nitrobenzene is then distilled off with steam, and the mixed crystal pigment is filtered off with suction, washed neutral and dried at 80° C.

79.8 g are obtained of a mixed crystal pigment whose X-ray diffraction spectrum differs from the X-ray diffraction spectrum of the corresponding physical mixture of the abovementioned starting materials. Incorporated into AM6 lacquer, the mixed crystal pigment produces strong and bright coatings, while coatings prepared with the physical mixture are very dark and dull.

EXAMPLE 5

2,000 ml of water are introduced first, followed by 120 g of sodium dithionite and 2 g of a commercial dispersant based on an alkylphenol polyglycol ether sulfate. 64 g of crude dibromoanthanthrone pigment, prepared by bromination of anthanthrone, and 16 g of crude dichloroanthanthrone pigment, prepared by chlorination of anthanthrone, were added. 160 g of 33% strength sodium hydroxide solution was then added dropwise at 20°–25° C., resulting in a pH of 12.8. After stirring for one hour at 20°–25° C., 47.9 g of 85% strength phosphoric acid were added dropwise in the course of 15 minutes until the pH was 10–11. The mixture was then stirred at 20°–25° C. for 1 hour, and 180 g of 35% strength perhydrol and 99.4 g of 33% strength sodium hydroxide solution were simultaneously added dropwise at pH 10–11. After completion of the addition, the mixture was subsequently stirred at 20°–25° C. for 15 hours and filtered with suction, and the filter residue was washed neutral.

The press cake thus obtained is suspended in a solution of 48.9 ml of water and 5.6 g of anhydrous sodium carbonate. 80 g of nitrobenzene are added, and the mixture is heated at the boil for 3 hours. The nitrobenzene is then distilled off with steam, and the mixed crystal pigment is filtered off with suction, washed neutral and dried at 80° C.

79.6 g are obtained of a mixed crystal pigment whose X-ray diffraction spectrum differs from the X-ray diffraction spectrum of the corresponding physical mixture of the abovementioned starting materials.

Figure 2:
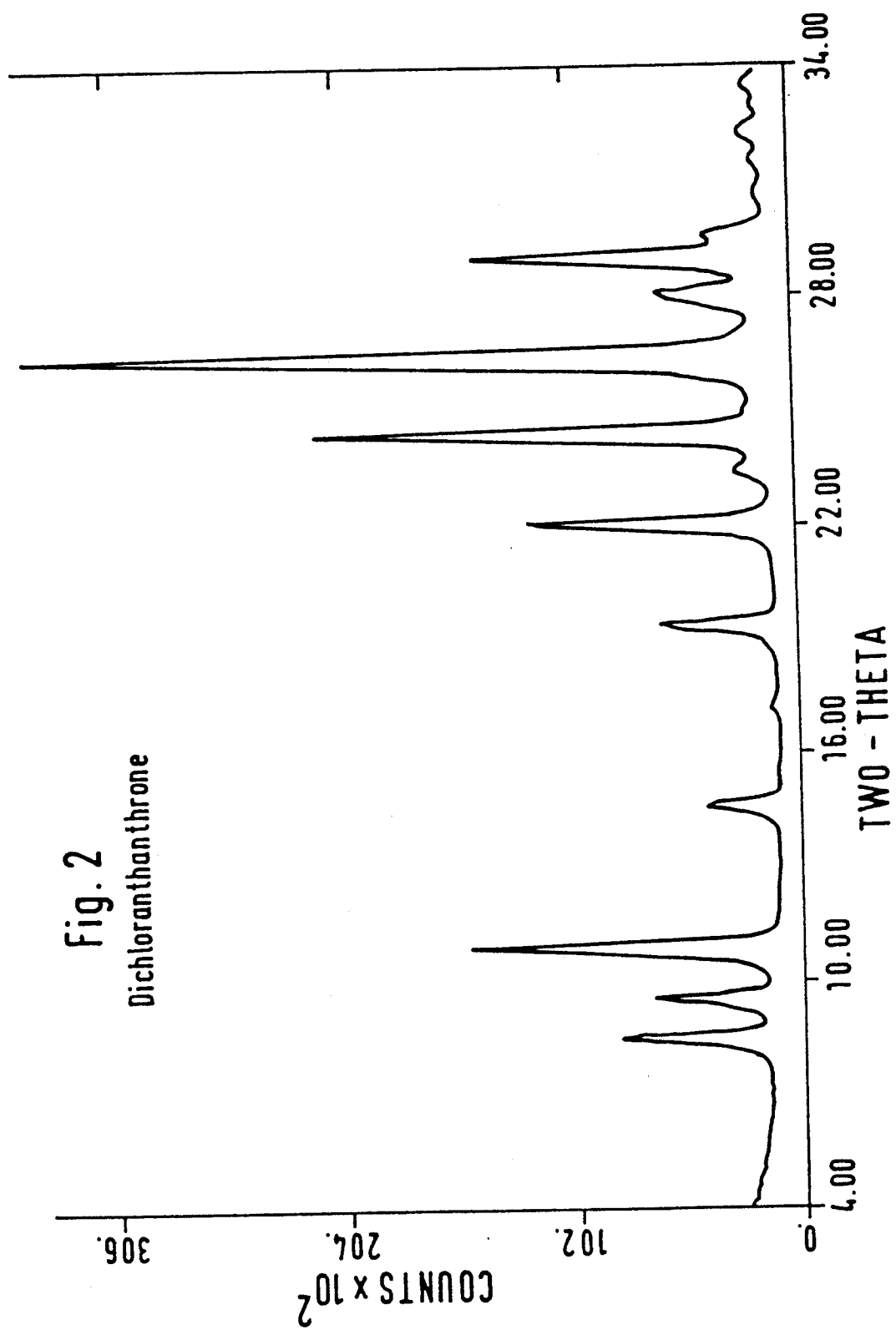

The X-ray diffraction spectra of the starting materials and of the mixed crystal pigment and of the corresponding physical mixture are depicted in the annex (cf. FIGS. 1–4).

Incorporated in AM6 lacquer, very transparent, bright and strong colorings are obtained, while the colorings obtained with the physical mixture are higher-hiding and duller.

The weatherability of the mixed crystal pigment is excellent, and its overpainting fastness is outstanding.

Testing in a TSA-NAD lacquer, transparent, strong and pure coatings are obtained. The mill base rheology is rated 3–4 and the gloss is rated 79. The viscosity of the 5% strength coating composition is 3.9″.

EXAMPLE 6

40 g of crude dibromoanthanthrone pigment, prepared by bromination of anthanthrone, and 10 g of crude dichloroanthanthrone pigment, prepared by chlorination of anthanthrone, are suspended together, each in the form of the moist press cake, in 81 ml of water. This suspension is then introduced into a bead mill model Drais PM 1, filled with 1,600 g of zirconium oxide beads $\phi$1.0–1.5 mm, and milled at 2,800 rpm for 2 hours. The mill base is then sieved, and the zirconium oxide beads are rinsed off with water. The pigment suspension is filtered off with suction and washed with water. The filtercake is stirred up with sufficient water and the weight of the suspension is 250 g. 50 g of 100% strength isobutanol are then added, and the mixture is heated at the boil for 3 hours. The isobutanol is then distilled off at up to 100° C. at the distillation bridge, the mixture is filtered with suction at 50° C., and the filter residue is washed with water and dried at 80° C. 47.6 g are obtained of a mixed crystal pigment whose X-ray diffraction spectrum differs from the X-ray diffraction spectrum of the corresponding physical mixture of the abovementioned starting materials.

In AM6 lacquer, very high-hiding, bright, pure and strong coatings are obtained. The test in polyvinyl chloride gives strong and pure colorings.

EXAMPLE 7

24 g of crude dibromoanthanthrone pigment, prepared by bromination of anthanthrone, and 6 g of crude dichloroanthanthrone pigment, prepared by chlorination of anthanthrone, are introduced into a 1 l plastics mill filled with 1,400 g of Cylpebs φ10–12 mm. This is followed by 6 hours of milling on a vibratory mill (model Vibratom, Siebtechnik Mülheim). The mill base is then sieved, 23.8 g of mill base are obtained.

23.8 g of mill base are introduced into 80 g of 100% strength isobutanol, followed by 0.4 g of a commercial dispersant based on an alkylphenol polyglycol ether sulfate. The mixture is stirred at 20°–25° C. for 15 hours, and 300 ml of water are then added. The mixture is heated at the boil for 3 hours, the isobutanol is then distilled off at up to 100° C. at the distillation bridge, the mixture is filtered off with suction, and the filter residue is washed with water and dried at 80° C.

22.5 g are obtained of a mixed crystal pigment whose X-ray diffraction spectrum differs from the X-ray diffraction spectrum of the corresponding physical mixture of the abovementioned starting materials.

In AM6 lacquer, the mixed crystal pigment produces transparent and strong coatings.

EXAMPLE 8

40 g of crude dibromoanthanthrone pigment, prepared by bromination of anthanthrone and 10 g of crude dichloroanthanthrone pigment, prepared by chlorination of anthanthrone, are introduced at 20°–25° C. into 400 g of 100% strength sulfuric acid and dissolved therein. This solution is added to 2,000 g of ice-water, the mixture is filtered with suction, and the filter residue is washed neutral with water.

The filtercake is stirred up with sufficient water and the weight of the suspension is 600 g. 50 g of 100% strength isobutanol are then added, and the mixture is heated at the boil for 3 hours. The isobutanol is then distilled off at up to 100° C. at the distillation bridge, the mixture is filtered with suction at 50° C., and the filter residue is washed with water and dried at 80° C. 49.2 g are obtained of a mixed crystal pigment whose X-ray diffraction spectrum differs from the X-ray diffraction spectrum of the corresponding physical mixture of the abovementioned starting materials.

In AM6 lacquer, the mixed crystal pigment produces pure and strong coatings.

EXAMPLE 9

2,000 ml of water are introduced first followed by 120 g of sodium dithionite and 2 g of a commercial dispersant based on an alkylphenol polyglycol ether sulfate. 40 g of crude dibromoanthanthrone pigment, prepared by bromination of anthanthrone and 40 g of crude dichloroanthanthrone pigment, prepared by chlorination of anthanthrone, were added. 160 g of 33% strength sodium hydroxide solution were added dropwise at 20°–25° C., resulting in a pH of 12. After stirring at 20°–25° C. for one hour, 47.8 g of 85% strength phosphoric acid were added dropwise in the course of 15 minutes until the pH was 10–11. The mixture is subsequently stirred at 20°–25° C. for 1 hour, and 180 g of 35% strength perhydrol and 98.4 g of 33% strength sodium hydroxide solution were then simultaneously added dropwise at pH 10–11. After the addition is completed, the mixture is stirred at 20°–25° C. for 15 hours and then filtered with suction, and finally the filter residue is washed neutral.

The press cake thus obtained is suspended in a solution of 48.9 ml of water and 5.6 g of anhydrous sodium carbonate. After 80 g of xylene has been added, the mixture is heated at the boil for 3 hours. The xylene is then distilled off with steam, and the mixed crystal pigment is filtered off with suction, washed neutral and dried at 80° C.

78.6 g are obtained of a mixed crystal pigment whose X-ray diffraction spectrum differs from the X-ray diffraction spectrum of the corresponding physical mixture of the abovementioned starting materials.

In AM6 lacquer, the mixed crystal pigment produces transparent, bright and strong coatings.

We claim:

1. A mixed crystal pigment of the anthanthrone series formed from two or more compounds of the general formula I

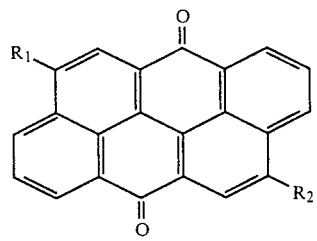

where $R_1$ and $R_2$ are each hydrogen, chlorine, bromine, iodine, nitro, cyano, amino, hydroxyl, $C_1$–$C_4$-alkyl, $C_1$–$C_4$-alkoxy, aryloxy, which may be halogen-substituted, or $C_1$–$C_4$-alkyl-substituted, $C_1$–$C_4$-alkylsulfonyl, benzylsulfonyl, which may be halogen-substituted, or $C_1$–$C_4$-alkyl-substituted, acetoxy, anilino, which may be halogen-substituted, $C_1$–$C_4$-alkyl-substituted or haloalkyl-substituted, naphthindonylamino or phthalimido, wherein each component may be present in an amount of from 1 to 99%, and $R_1$ and $R_2$ may be identical or different.

2. A mixed crystal pigment as claimed in claim 1, wherein $R_1$ and $R_2$, which may be identical or different, are each chlorine, bromine, iodine, methoxy or ethoxy.

3. A mixed crystal pigment as claimed in claim 1, wherein one of the components is present in an amount of from 70 to 95%.

4. A process for preparing a mixed crystal anthanthrone pigment as claimed in claim 1, which comprises first converting two or more finely or coarsely crystalline crude anthanthrone pigments or coarsely crystalline crude mixed crystal anthanthrone pigments of the general formula I mentioned by
    (1) revatting from an aqueous solution or suspension,
    (2) bead milling in water or solvents,
    (3) dry grinding with or without salt,
    (4) dissolving in concentrated inorganic acid and precipitating by pouring into water, or (5) suitable synthesis management under reaction conditions chosen in such a way that after the synthesis the anthanthrone pigments are present in solution and are precipitated on pouring into water, into the corresponding finely divided crude mixed crystal anthanthrone pigments and subsequently converting these by a conditioning treatment in an inert organic solvent or in a dilute inorganic acid at temperatures of from about 50° to about 200° C. into the mixed crystal anthanthrone pigment of the general formula I mentioned in claim 1.

5. A process for preparing a mixed crystal anthanthrone pigment as claimed in claim 1, which comprises first converting two or more finely or coarsely crystalline crude anthanthrone pigments or coarsely crystalline crude mixed crystal anthanthrone pigments of the general formula I mentioned by
 (1) revatting from an aqueous solution or suspension,
 (2) bead milling in water or solvents,
 (3) dry grinding with or without salt,
 (4) dissolving in concentrated inorganic acid and precipitating by pouring into water, or
 (5) suitable synthesis management under reaction conditions chosen in such a way that after the synthesis the anthanthrone pigments are present in solution and are precipitated on pouring into water, into the corresponding finely divided crude mixed crystal anthanthrone pigments and subsequently converting these by a conditioning treatment in an inert organic solvent or in a dilute inorganic acid at temperatures of from about 80° to about 160° C. into the mixed crystal anthanthrone pigment of the general formula I mentioned in claim 1.

6. The process as claimed in claim 4, wherein the conditioning treatment is carried out in an alkanol of from 2 to 6 carbon atoms, with xylene, ethylbenzene, cumene, nitrobenzene or nitrophenol as insert organic solvent.

7. The process as claimed in claim 4, wherein the conditioning treatment is carried out in dilute sulfuric acid.

8. The process as claimed in claim 4, wherein the finish is carried out in a stirred vessel or by the action of shearing forces in grinding or kneading apparatus.

9. The process as claimed in claim 4, wherein the comminution and conditioning processes are carried out in the presence of surface-active-compounds.

10. A process for pigmenting high molecular weight natural or synthetic organic materials comprising the step of pigmenting the said materials with a mixed crystal pigment of claim 1.

* * * * *